United States Patent

[11] 3,592,554

[72] Inventor Akio Takahara
No. 49-40, Oaza Otogane, Ohno-machi, Chikushi District, Fukuoka, Japan
[21] Appl. No. 843,342
[22] Filed July 22, 1969
[45] Patented July 13, 1971
[32] Priority Aug. 5, 1968
[33] Japan
[31] 43/55341

[54] TREPAN BORING TOOL
3 Claims, 10 Drawing Figs.
[52] U.S. Cl. ................................................ 408/204, 408/703
[51] Int. Cl. .................................................. B23b 51/04
[50] Field of Search ............................................ 77/68, 69

[56] References Cited
UNITED STATES PATENTS
3,244,035 4/1966 Jehle et al. ..................... 77/69

Primary Examiner—Francis S. Husar
Attorney—Wenderoth, Lind & Ponack

ABSTRACT: A trepan boring tool comprises a blade-holding cylinder provided on its free end face with a plurality of blades projecting from said end face, the first cutting blade having its tip projecting radially outwardly of the outer periphery of said blade-holding cylinder, the second blade spaced away from said first blade through an angle of about 180° and having its tip projecting radially inwardly of the inner periphery of said cylinder, the remaining blades being arranged to be performable work upon an intermediate part of thickness of a workpiece between the paths of said first and second blades, and means for laterally shifting the axis of said cylinder with respect to a tool shank axis which may be fitted in the machine, the arrangement being such that said cylinder is allowed to be eccentrically rotated upon rotation of the main spindle axis of the machine and therefore the adjustment of the cut or cutting inner and outer radii can be effected at will, resulting in an improvement of cutting operation.

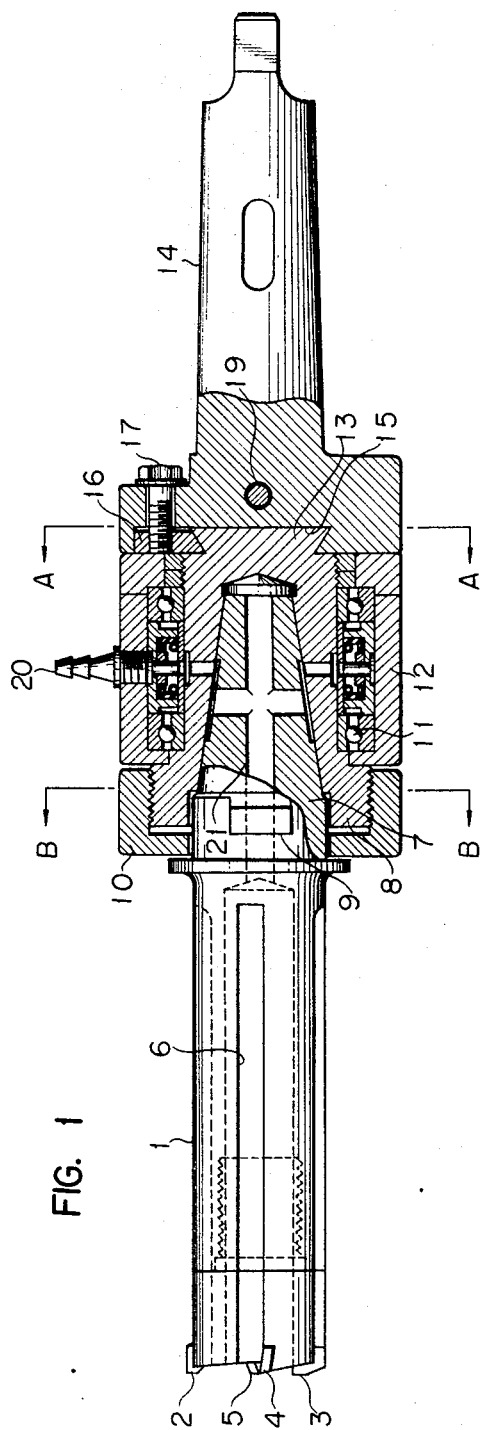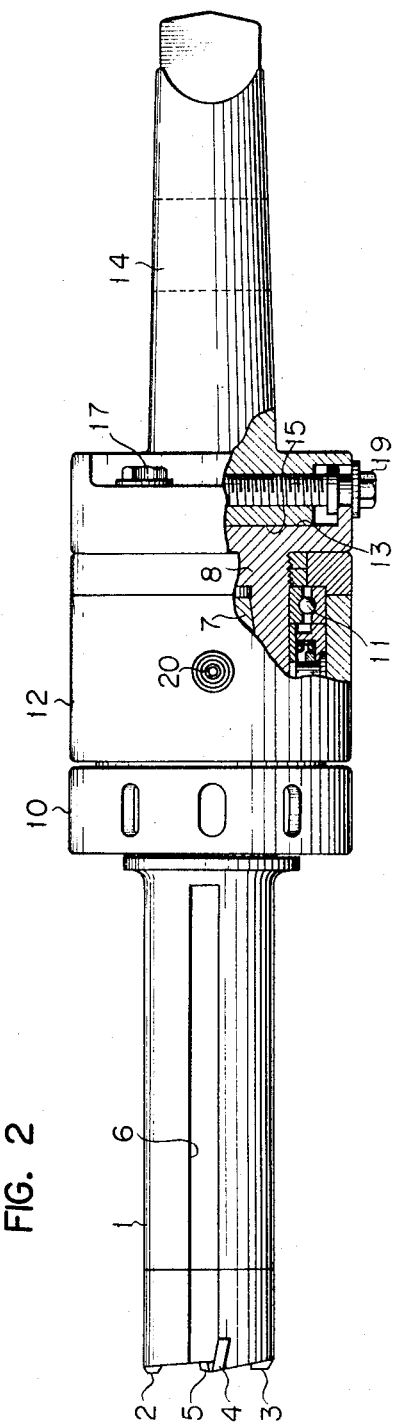

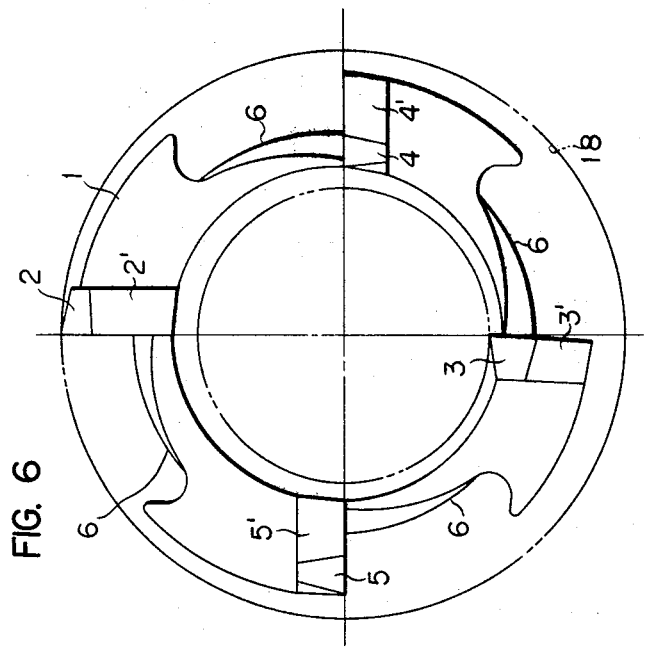
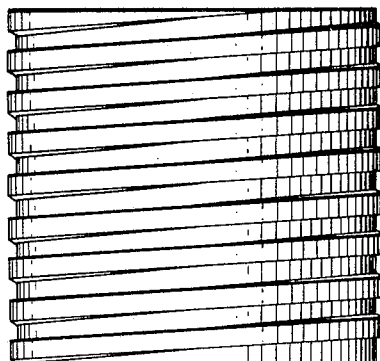
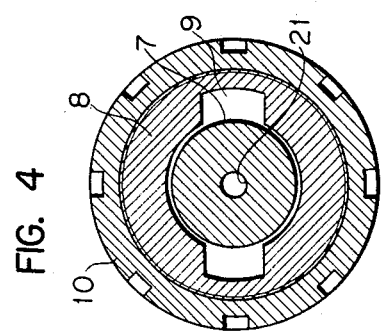
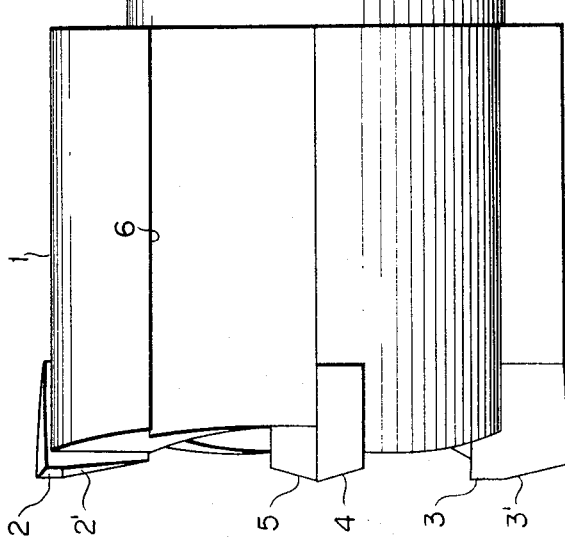

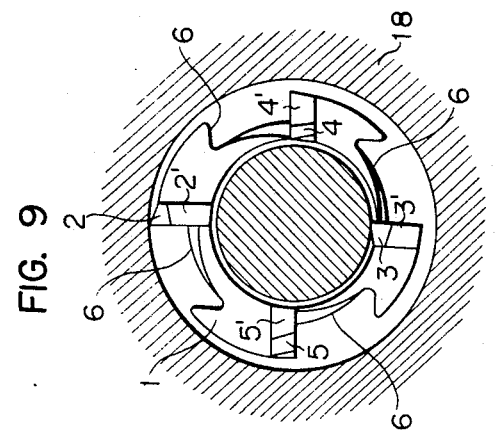
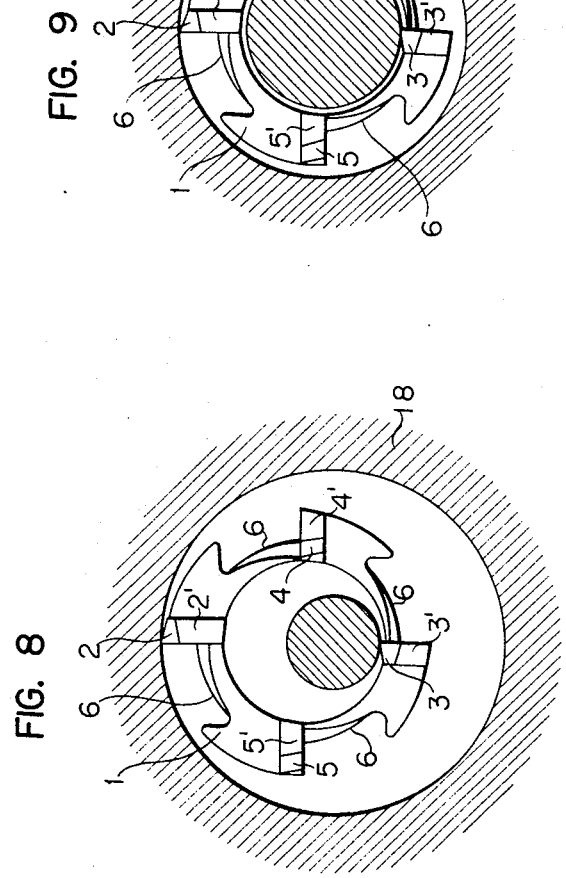
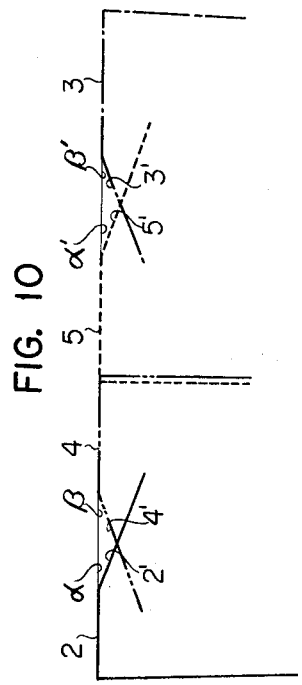
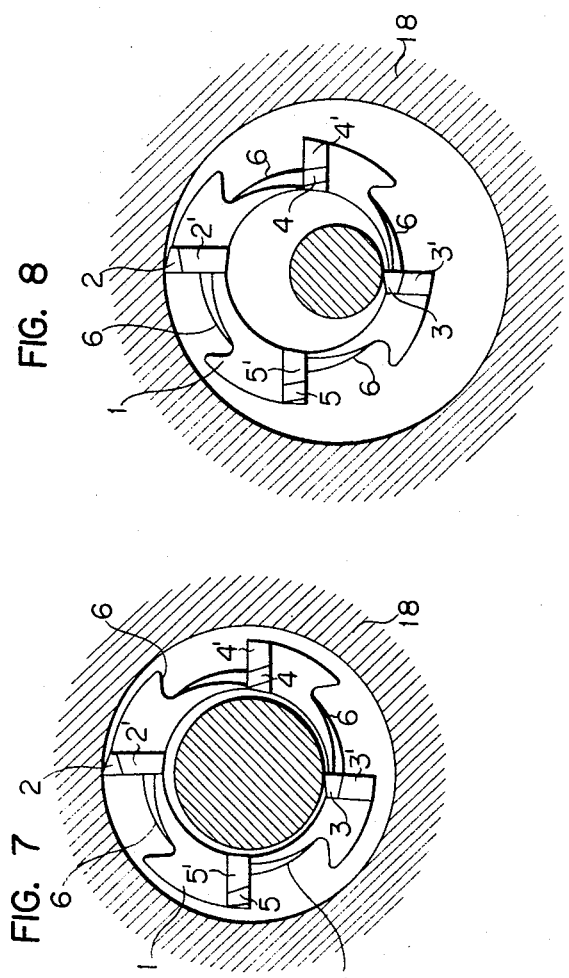

TREPAN BORING TOOL

This invention relates to an improved construction of a trepan boring tool.

The principal object of the present invention is to provide a trepan boring tool capable of effecting at will the adjustment of the cut or cutting inner and outer radii and thus highly improving an efficiency of operation.

A further object of the invention is to provide a trepan boring tool, wherein a cylindrical member with a plurality of blades is adapted to have an inner and an outer periphery whose center axes are eccentric relatively to each other, thereby to provide between the outer periphery of said cylindrical member and the outer wall of a cylindrical hole being cut a radial clearance sufficient for efficient escape of lubricant and chips therethrough, resulting in improvement in a cutting efficiency.

Still another object of the invention is to provide a trepan-boring tool, wherein each blade fixed on the cylindrical member is provided with a noninclined cutting edge extending perpendicularly to the longitudinal axis of said cylinder, and an inclined cutting edge inclined radially inwards or outwards, whereby an intermediate part of thickness of a workpiece between the paths of the noninclined cutting edges of the blades may be cut completely by said inclined cutting edges, and a cutting resistance applied to each blade may be adjusted to a preferred value by means of changing an angle of inclination of its inclined cutting edge to the direction of radius of the cylindrical member, resulting in smooth and efficient cutting operation.

These and other objects of the present invention will be apparent from the following description, taken with the accompanying drawings wherein:

FIG. 1 is a side elevational view, partly in section of a trepan boring tool of the present invention;

FIG. 2 is a plan view, partly in section, thereof;

FIGS. 3 and 4 are sectional views taken on lines A-A and B-B of FIG. 1, respectively;

FIG. 5 is a side elevational view of the toolhead of the trepan boring tool, shown on an enlarged scale;

FIG. 6 is a front end view of the toolhead of FIG. 5 as seen from the left of FIG. 5;

FIGS. 7 to 9 are views for explaining the operation of the trepan boring tool; and FIG. 10 is an explanatory view of relations between areas being cut by noninclined cutting edges and inclined cutting edges.

Attention is directed to the drawings, and more particularly to FIGS. 1 and 2 of the drawings, wherein a trepan-boring tool of the invention comprises a hollow cylinder or cylindrical member 1 including a head portion with a plurality of blades or bits in this example, four blades 2 to 5 as will be described hereinafter. The cylindrical member 1 is formed with an inner and an outer periphery whose center axes are not in alignment and thus spaced away through a predetermined amount from each other, and provided on the outer periphery thereof with a plurality of axially extending grooves or flutes 6 for guiding chips and lubricant to discharge them out of a hole being cut. Each groove has an open end facing axially outwardly and a closed end terminated at a point near a flange portion of the cylindrical member 1. As best shown in FIG. 6, the side face of each blade substantially flushes with a sidewall of the associated groove to assist in escape of the chips and lubricant.

As shown in FIGS. 1 and 2, the trepan-boring tool of the invention further comprises coupling means for detachably connecting said cylindrical member 1 to a tool shank 14 in laterally shiftable relation, and which shank may be fitted for rotation in the machine and is caused upon operation of the machine to be rotated about its horizontal axis. The means includes a chuck or cylinder holder 8 with a central taper opening into which a root portion 7 (which is of a complementary shaped contour) of the cylindrical member 1 is detachably fitted, and further a thread ring 10 screw thread fitted onto an enlarged portion of said holder while being engaged by projections 9 formed on the cylinder at respective positions immediately ahead of said tapered root portion thereby to firmly set the cylindrical member 1 in position. The coupling means is further provided with a sleeve member 22 necessary for supplying cutting fluids to the material being cut and to the tool in order to facilitate the cutting operation. Thus, the sleeve 12 is positioned to encircle the holder 8 and supported by means of bearings 11 on the periphery of said holder.

As best shown in FIG. 1, said chuck 8 is formed with a dovetail 13 engaging a complementary shaped dovetail groove 15 formed on the left-hand end face of the tool shank 14, thereby to allow the center axis of the coupling means to be laterally shifted into adjusted position relatively to the tool shank axis or the machine spindle axis. The chuck 8 can be fixedly secured to the tool shank 14, after adjusted in position, by bolt means 17 extending through a flange portion of the shank and a clamp piece 16. It will be understood, from FIGS. 2 and 3, that the sliding movement of the dovetail 13 relatively to the dovetail groove 15 can be effected by adjusting an adjusting screw 19 which extends (upwardly in FIG. 2) through a lip provided on the dovetail 13 and into the flange portion of the tool shank 14.

In FIG. 1, on the periphery of the sleeve 12 there is provided a cutting fluid inlet or nipple 20 screwed thereinto through which cutting fluid or oil, such as sulfurized oil, can be supplied to drilled passages 21 provided within the root portion 7 of the cylindrical member 1 and which passages communicate with an eccentric opening defined by the inner periphery of the cylindrical member 1. Thus, in operation, the cutting oil may cool the tool and the workpiece, and lubricate the chip-tool interface, and then along with the resulted chips will be discharged through the grooves 6 up to the outside of the hole being cut. A center axis of the eccentric opening coincides with the center axis of the chuck 8, in this example.

As will be appreciated, said blades 2 to 5 are fixedly connected by the usual means to the cylinder at the respective positions of the outermost or leftmost end face of the tool head of the cylindrical member 1, and radially arranged so that the adjacent two blades make an angle of 90° with each other and all blades project slightly axially outwardly from the leftmost end face of the cylindrical member 1. Further, a tip of one blade — in this example, the blade 2, is adapted to project radially outwardly from the outer periphery of the cylindrical member 1 by a little length, while a tip of the blade 3 diametrically symmetric with or spaced away from the blade 2 through an angle of about 180° is adapted to project radially inwardly from the inner periphery of the same. In this embodiment, the blades 4 and 5 project neither of the inner and outer peripheries of the cylindrical member.

As will be readily appreciated, the size of the cut or cutting inner and outer radii depends on an eccentricity of the rotational axis of the chuck 8 (i.e. the center axis of the inner or outer periphery of the cylinder 1) with respect to the tool shank axis or the machine spindle axis, and therefore an increase of the eccentricity of the cylindrical member 1 relatively to the rotational axis of the tool shank 14 is accompanied by an increase of a difference between a cutting radius of the blade 2 and a cutting radius of the blade 3. The increase of such a difference, however, has a tendency to cause an intermediate part of a thickness of the workpiece between the paths of the blades 2 and 3 to remain uncut by the blades 4 and 5 while causing an increase in value of a cutting resistance allotted to the blade 2 and a decrease in value of a cutting resistance allotted to the blade 3.

In order to overcome such disadvantages, each blade is provided with two kinds of cutting edge, that is, a noninclined cutting edge extending in a direction substantially perpendicular to the rotational axis of the cylindrical member, and an inclined cutting edge inclined radially outwards or inwards. In this example, as illustrated in FIG. 10, the blades 2 and 5 have cutting edges 2' and 5' inclined radially inwards, respectively, and the blades 3 and 4 have cutting edges 3' and 4' inclined radially outwards, respectively. The inclined cutting edges 2' and 4' are adapted to incline at relatively small angles of $\alpha$ and $\beta$, respectively, to effect a relatively small axial depth of cut thereof while the inclined cutting edges 3' and 5' are adapted to have relatively large angles of inclination $\alpha'$ and $\beta'$, respectively, to effect a relatively large axial depth of cut thereof. This allows the cutting resistance applied to each blade to be conveniently adjusted.

With the above structure in mind, the operation of the trepan boring tool will be described with reference to FIGS. 7 to 9. Upon the rotation of the tool shank 14 fitted in the machine, the cylindrical member 1 is turned on the rotational axis of the tool shank or the main spindle axis of the machine, and work upon a fixed workpiece 18 will be initiated. As described hereinbefore, the size of the cut or cutting inner and outer radii depends on the eccentricity of the rotational axis of the chuck 8 (i.e. the center axis of the inner or outer periphery of the cylinder 1) with respect to the tool shank axis. Thus, in the case of a relatively large eccentricity of the rotational axis of the cylinder as in FIG. 8, it is possible to obtain a cylindrical hole having a relatively large outer diameter and a relatively small inner diameter (i.e. a small-diameter core), and in the case of a relatively small eccentricity of the same as in FIG. 7 on the other hand, a cylindrical hole of a relatively small outer diameter and a relatively large inner diameter (i.e. a large diameter core) can be obtained. If the coupling means is adjusted its center axis by the screw 19 to be in alignment with the tool shank axis as in FIG. 9, the cylindrical member 1 is rotated upon its own axis of the inner periphery and therefore a cylindrical hole of a minimum outer diameter and a maximum inner diameter may be provided.

In this manner, according to the invention, the adjustment of the cut or cutting inner and outer radii can be carried out at will by the use of a single trepan boring tool of which axis is laterally shiftable with respect to the tool shank axis or the machine spindle axis, and the other objects as hereinbefore mentioned can be attained too.

Although the invention has been illustrated and described with reference to a single preferred embodiment thereof, it is to be understood that various changes in the details of constructions and the arrangement and combination of parts may be resorted to without departing from the spirit and scope of the invention. For example, it should be appreciated that while the trepan boring tool of the invention has been described as being rotated for use with the stationary (i.e. nonrotating) workpiece, a trepan boring tool may be held in stationary condition and a workpiece is rotated instead of rotating the trepan boring tool.

What I claim is:
1. A trepan boring tool comprising:
A hollow cylinder provided on its free end face with a plurality of blades projecting from said end face;
the first blade having its tip slightly projecting radially outwardly of the outer periphery of said cylinder, the second blade spaced away from said first blade through an angle of about 180° and having its tip projecting slightly radially inwardly of the inner periphery of said cylinder, and the remaining blades being arranged to perform work upon an intermediate part of thickness of the workpiece between the paths of said first and second blades;
said hollow cylinder being provided on its outer periphery with a plurality of grooves for guiding chips to the outside of a hole being cut, each groove extending axially from a peripheral portion to which the working face of the associated blade faces;
a tool shank which may be fitted in the machine; and
means for laterally shifting an axis of said cylinder with respect to a rotational axis of said tool shank or a spindle axis of the machine, whereby said cylinder is allowed to be eccentrically rotated upon rotation of said spindle axis of the machine.

2. A hollow tool assembly as set forth in claim 1, wherein said hollow cylinder has an inner and an outer periphery whose center axes are spaced away from each other by a predetermined amount.

3. A hollow tool assembly for machine tools comprising:
a hollow cylinder provided on its free end face with a plurality of blades projecting from said face;
the first blade having a tip slightly projecting radially outwardly of the outer periphery of said cylinder, the second blade spaced away from said first blade through an angle of about 180° and having its tip slightly projecting radially inwardly of the inner periphery of said cylinder, and each of said first and second blades and remaining blades being provided with a noninclined cutting edge extending in the direction of radius of said cylinder and a cutting edge inclined radially either inwards or outwards, whereby an intermediate part of thickness of a workpiece between the paths of the noninclined cutting edges of the blades can be cut and a cutting resistance applied to each blade is adjustable by changing an angle of inclination of said inclined cutting edges to the cylinder axis;
said hollow cylinder being provided on its outer periphery with a plurality of grooves for guiding resulted chips to the outside of a hole being cut, each groove extending axially from a peripheral portion to which the working face of the associated blade faces;
a tool shank which may be fitted in the machine; and
means for laterally shifting the axis of said hollow cylinder with respect to a rotational axis of said tool shank or a spindle axis of the machine, whereby said cylinder is allowed to be eccentrically rotated upon rotation of said spindle axis of the machine.